United States Patent
Wang et al.

(10) Patent No.: US 11,456,543 B2
(45) Date of Patent: Sep. 27, 2022

(54) ANTENNA ASSEMBLY AND ANTENNA TUNING-FREE METHOD AND APPARATUS

(71) Applicant: HUAWEI TECHNOLOGIES CO., LTD., Shenzhen (CN)

(72) Inventors: Jueping Wang, Shenzhen (CN); Shanchao Cui, Kista (SE); Yongjiu Li, Chengdu (CN); Zhulin Cheng, Dongguan (CN); Xiaojiang Han, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 17/171,170

(22) Filed: Feb. 9, 2021

(65) Prior Publication Data

US 2021/0167520 A1 Jun. 3, 2021

Related U.S. Application Data (63) Continuation of application No. PCT/CN2018/101193, filed on Aug. 17, 2018.

(51) Int. Cl.
*H04B 7/08* (2006.01)
*H01Q 21/29* (2006.01)
(Continued)

(52) U.S. Cl.
CPC .............. *H01Q 21/293* (2013.01); *H01Q 3/24* (2013.01); *H01Q 3/247* (2013.01);
(Continued)

(58) Field of Classification Search
CPC ........ H01Q 21/293; H01Q 3/24; H01Q 3/247; H01Q 9/0478; H04B 7/0602; H04B 7/0802; H04B 7/0874
See application file for complete search history.

(56) References Cited

U.S. PATENT DOCUMENTS

| 5,686,926 A | 11/1997 | Kijima et al. |
| 2005/0156799 A1 | 7/2005 | Theobold |

(Continued)

FOREIGN PATENT DOCUMENTS

| CN | 101056451 A | 10/2007 |
| CN | 101326683 A | 12/2008 |

(Continued)

OTHER PUBLICATIONS

Jiang et al. "FPGA Implementation of Surface Tracking System for a Satellite Communication on the Move Terminal", Telecommunication Engineering. vol. 57, No. 6. Jun. 2017. 6 pages. English Abstract provided.

*Primary Examiner* — Nhan T Le
(74) *Attorney, Agent, or Firm* — Maier & Maier, PLLC (57) ABSTRACT

A quantity of antennas included in the antenna assembly is greater than a quantity of receive antennas supported by customer premises equipment (CPE). Therefore, when a network changes, the CPE may select, from a plurality of antennas included in the antenna assembly, a quantity of antennas with relatively good data transmission performance as receive antennas, where the quantity is the same as the quantity of receive antennas supported by the CPE. That is, the CPE may not need to adjust directions of antennas, but select, from a redundant quantity of set antennas, antennas with relatively good receiving performance to ensure that the CPE is aligned with a direction with relatively good signal quality.

13 Claims, 3 Drawing Sheets

(51) Int. Cl.
*H01Q 3/24* (2006.01)
*H01Q 9/04* (2006.01)
*H04B 7/06* (2006.01)

(52) U.S. Cl.
CPC ......... *H01Q 9/0478* (2013.01); *H04B 7/0602* (2013.01); *H04B 7/0802* (2013.01); *H04B 7/0874* (2013.01)

(56) References Cited

U.S. PATENT DOCUMENTS

| | | |
|---|---|---|
| 2006/0145921 A1 | 7/2006 | Ranta et al. |
| 2006/0164320 A1 | 7/2006 | Lastinger et al. |
| 2008/0012710 A1 | 1/2008 | Sadr |
| 2008/0068271 A1 | 3/2008 | Iwai et al. |
| 2010/0315312 A1 | 12/2010 | Viorel et al. |
| 2011/0260919 A1* | 10/2011 | Montag ............... H01Q 21/20 342/374 |
| 2014/0313080 A1 | 10/2014 | Smith et al. |
| 2015/0229382 A1 | 8/2015 | Lee et al. |
| 2016/0013855 A1 | 1/2016 | Campos et al. |
| 2016/0359240 A1* | 12/2016 | Cho ................... H01Q 21/24 |
| 2017/0059688 A1 | 3/2017 | Gan |
| 2017/0223102 A1 | 8/2017 | Lee et al. |
| 2019/0181926 A1* | 6/2019 | Liang ................ H04B 7/0617 |

FOREIGN PATENT DOCUMENTS

| | | |
|---|---|---|
| CN | 104752832 A | 7/2015 |
| CN | 106537178 A | 3/2017 |
| CN | 107317608 A | 11/2017 |
| CN | 107483075 A | 12/2017 |
| CN | 107863605 A | 3/2018 |
| WO | 2004093416 A1 | 10/2004 |
| WO | 2018111690 A1 | 6/2018 |

* cited by examiner

ANTENNA ASSEMBLY AND ANTENNA TUNING-FREE METHOD AND APPARATUS

CROSS-REFERENCE TO RELATED APPLICATIONS

This application is a continuation of International Application No. PCT/CN2018/101193, filed on Aug. 17, 2018, the disclosure of which is hereby incorporated by reference in its entirety

TECHNICAL FIELD

The embodiments relate to the field of terminal technologies, and in particular, to an antenna assembly and an antenna tuning-free method and apparatus.

BACKGROUND

With development of internet services, users have higher and higher requirements on network quality of broadband internet access. However, in some remote areas, because deployment costs of base stations are relatively high, a distance between two adjacent base stations is relatively large. In this case, to ensure the network quality, wireless customer premises equipment (CPE) may be disposed near a residence of a user. Alternatively, in some areas, because cable deployment is inconvenient or deployment costs of cables are relatively high, CPE may also be deployed to resolve a problem of internet access of a user. Usually, the CPE includes a plurality of directional antennas used to receive signals. During installation, directions of antennas of the CPE may be adjusted, so that the CPE is aligned with a direction with relatively good signal quality as much as possible. However, in a process of using the CPE, if a network changes, that is, directions of antennas of a base station change, or a base station is newly added, the directions of the antennas of the CPE need to be readjusted.

Currently, a main adjustment method is that a skilled person manually rotates the antennas to implement antenna direction adjustment. In this case, the CPE needs to provide rotation space for antenna rotation, and consequently, a size of the CPE is relatively large, and installation is difficult. In addition, manual adjustment is required, and consequently, an operation is inconvenient. Based on this, to avoid the foregoing problem, an antenna tuning-free apparatus and method urgently need to be provided. In other words, even if the directions of the antennas are not adjusted when the network changes, the CPE can be aligned with the direction with the relatively good signal quality.

SUMMARY

The embodiments provide an antenna assembly and an antenna tuning-free method and apparatus, to resolve a problem in a related technology that a size of customer premises equipment (CPE) is relatively large, installation is different, and operation is inconvenient because antennas need to be manually rotated. The solutions are as follows.

According to a first aspect, an antenna assembly is provided. The antenna assembly is used in CPE, where the antenna assembly includes a plurality of antenna planes, each of the plurality of antenna planes is a side surface of a polyhedron, at least one antenna is disposed on each antenna plane, a total quantity of antennas disposed on all antenna planes is greater than a target quantity, and the target quantity is a quantity of receive antennas that are supported by the CPE and that are used to simultaneously receive data.

In this embodiment, a quantity of antennas included in the antenna assembly may be greater than the quantity of receive antennas supported by the CPE. In this way, when a network changes, the CPE may select, from a plurality of included antennas, a quantity of antennas with relatively good data transmission performance as receive antennas, where the quantity is the same as the quantity of receive antennas supported by the CPE. That is, the CPE may not need to adjust directions of antennas, but select, from a redundant quantity of set antennas, antennas with relatively good receiving performance to ensure that the CPE is aligned with a direction with relatively good signal quality. Because the CPE does not need to be aligned with the direction with the relatively good signal quality by rotating the directions of the antennas, not only a high gain of the antennas of the CPE is ensured, but also inconvenience caused by manual rotation is avoided. In addition, the CPE may not need to provide rotation space for antenna rotation, thereby reducing a size of the CPE and facilitating installation.

Optionally, the at least one antenna disposed on each antenna plane is a directional antenna.

Optionally, one omnidirectional antenna is further disposed on each surface in which each antenna plane is located.

Optionally, each of the plurality of antenna planes is connected to an electronic switch, and the electronic switch is configured to control enabling and disabling of an antenna on a corresponding antenna plane.

The electronic switch connected to each antenna plane may uniformly control enabling and disabling of all antennas on the corresponding antenna plane or may independently control enabling and disabling of each antenna on the corresponding antenna plane. In other words, all antennas on the antenna plane may be enabled by turning on an electronic switch connected to the antenna plane, or any antenna on the antenna plane may be enabled by turning on a switch connected to the antenna plane.

Optionally, a quantity of antennas disposed on each of the plurality of antenna planes is the same.

According to a second aspect, an antenna tuning-free method is provided. The method is used by customer premises equipment CPE, where the CPE includes the antenna assembly according to any one of the first aspect or the possible implementations of the first aspect, and the method includes:

selecting at least one target antenna plane from a plurality of antenna planes based on a target quantity, where a data transmission performance value of the at least one target antenna plane is greater than a first threshold, and the data transmission performance value is used to represent receiving performance of receiving data by the CPE through an antenna on the at least one target antenna plane; and determining a target quantity of target antennas based on the antenna included in the at least one target antenna plane and using the target quantity of determined target antennas as receive antennas of the CPE.

In this embodiment, a quantity of antennas included in the antenna assembly may be greater than a quantity of receive antennas supported by the CPE. In this way, when a network changes, the CPE may select, based on the target quantity from the plurality of antenna planes, the at least one target antenna plane with relatively good data transmission performance, and determine the receive antennas of the CPE based on the antenna included in the at least one target antenna plane. That is, the CPE may not need to adjust directions of antennas, but select, from a redundant quantity of set antennas, antennas with relatively good receiving performance to ensure that the CPE is aligned with a direction with relatively good signal quality. Because the CPE does not need to be aligned with the direction with the relatively good signal quality by rotating the directions of the antennas, not only a high gain of the antennas of the CPE is ensured, but also inconvenience caused by manual rotation is avoided. In addition, the CPE may not need to provide rotation space for antenna rotation, thereby reducing a size of the CPE and facilitating installation.

Optionally, the selecting of at least one target antenna plane from a plurality of antenna planes based on a target quantity includes:

when a quantity of antennas disposed on each of the plurality of antenna planes is the same, and each antenna disposed on each antenna plane is a directional antenna, determining a ratio k of the target quantity to the quantity of antennas disposed on each of the plurality of antenna planes; and selecting the at least one target antenna plane from the plurality of antenna planes based on k.

Optionally, the selecting of the at least one target antenna plane from the plurality of antenna planes based on k includes:

if k is an integer greater than 1, classifying every k continuous antenna planes in the plurality of antenna planes into one antenna plane combination, to obtain a plurality of antenna plane combinations;

sequentially obtaining a data transmission performance value of each of the plurality of antenna plane combinations in first duration;

selecting, from the plurality of antenna plane combinations, an antenna plane combination whose data transmission performance value in the first duration is greater than the first threshold, and determining, in the selected antenna plane combination, an antenna plane combination with the largest data transmission performance value in the first duration; and determining at least one antenna plane included in the determined antenna plane combination as the at least one target antenna plane.

Optionally, the selecting of the at least one target antenna plane from the plurality of antenna planes based on k includes:

if k is greater than 1 and k is not an integer, rounding k, to obtain r;

classifying every r continuous antenna planes in the plurality of antenna planes into one antenna plane combination, to obtain a plurality of antenna plane combinations;

sequentially obtaining a data transmission performance value of each of the plurality of antenna plane combinations in first duration;

selecting, from the plurality of antenna plane combinations, an antenna plane combination whose data transmission performance value in the first duration is greater than the first threshold, and determining, in the selected antenna plane combination, an antenna plane combination with the largest data transmission performance value in the first duration; and determining at least one antenna plane included in the determined antenna plane combination and an antenna plane adjacent to the at least one antenna plane as the at least one target antenna plane.

Optionally, the determining of a target quantity of target antennas based on the antenna included in the at least one target antenna plane includes:

determining a difference T between the target quantity and a quantity of antennas included in the at least one antenna plane;

selecting T antennas from the antenna plane adjacent to the at least one antenna plane; and using an antenna disposed on each of the at least one antenna plane and the T selected antennas as the target quantity of target antennas.

Optionally, the selecting of the at least one target antenna plane from the plurality of antenna planes based on k includes:

if k is not greater than 1, obtaining a data transmission performance value of each of the plurality of antenna planes in first duration;

selecting, from the plurality of antenna planes, an antenna plane whose data transmission performance value in the first duration is greater than the first threshold, and determining, in the selected antenna plane, an antenna plane with the largest data transmission performance value in the first duration; and determining the determined antenna plane as the at least one target antenna plane.

Optionally, the selecting of at least one target antenna plane from a plurality of antenna planes based on a target quantity includes:

when a quantity of antennas disposed on each of the plurality of antenna planes is the same, and one omnidirectional antenna is disposed on each surface in which each antenna plane is located, determining a difference M between the target quantity and a quantity N of a plurality of omnidirectional antennas; and selecting the at least one target antenna plane from the plurality of antenna planes based on M and a first value, where the first value is the quantity of antennas disposed on each of the plurality of antenna planes.

Optionally, the selecting of the at least one target antenna plane from the plurality of antenna planes based on M and a first value includes:

if M is greater than the first value, rounding a ratio of M to the first value, to obtain w;

classifying every w+1 continuous antenna planes in the plurality of antenna planes into one antenna plane combination, to obtain a plurality of antenna plane combinations;

sequentially obtaining a data transmission performance value of each of the plurality of antenna plane combinations in first duration;

selecting, from the plurality of antenna plane combinations, an antenna plane combination whose data transmission performance value in the first duration is greater than the first threshold, and determining, in the selected antenna plane combination, an antenna plane combination with the largest data transmission performance value in the first duration; and determining at least one antenna plane included in the determined antenna plane combination as the at least one target antenna plane; and correspondingly, the determining a target quantity of target antennas based on the antenna included in the at least one target antenna plane includes:

selecting M antennas from the antenna included in the at least one target antenna plane; and determining the M selected antennas and the plurality of omnidirectional antennas as the target quantity of target antennas.

Optionally, the selecting of the at least one target antenna plane from the plurality of antenna planes based on M and a first value includes:

if M is not greater than the first value and M is greater than 0, obtaining a data transmission performance value of each of the plurality of antenna planes in first duration;

selecting, from the plurality of antenna planes, an antenna plane whose data transmission performance value in the first duration is greater than the first threshold, and determining, in the selected antenna plane, an antenna plane with the largest data transmission performance value in the first duration; and determining the determined antenna plane as the at least one target antenna plane; and correspondingly, the determining a target quantity of antennas based on the antenna included in the at least one target antenna plane includes:

selecting M antennas from the antenna included in the at least one target antenna plane; and determining the M selected antennas and the plurality of omnidirectional antennas as the target quantity of target antennas.

Optionally, the sequentially obtaining of a data transmission performance value of each of the plurality of antenna plane combinations in first duration includes:

for any antenna plane combination A in the plurality of antenna plane combinations, enabling an antenna on each of a plurality of antenna planes included in the antenna plane combination A, and disabling an antenna on another antenna plane other than the plurality of antenna planes included in the antenna plane combination A;

receiving, in the first duration, data through antennas on the plurality of antenna planes included in the antenna plane combination A, and determining a ratio of a throughput of the antenna plane combination A to a quantity of resource blocks of the antenna plane combination A in each transmission time interval in the first duration; and determining a sum of ratios of a throughput to a quantity of resource blocks in a plurality of transmission time intervals in the first duration as a data transmission performance value of the antenna plane combination A in the first duration.

Optionally, the obtaining of a data transmission performance value of each of the plurality of antenna planes in first duration includes:

for any antenna plane B in the plurality of antenna planes, enabling at least one antenna on the antenna plane B, and disabling an antenna on another antenna plane other than the antenna plane B;

receiving, in the first duration, data through the at least one antenna on the antenna plane B, and determining a ratio of a throughput of the antenna plane B to a quantity of resource blocks of the antenna plane B in each transmission time interval in the first duration; and determining a sum of ratios of a throughput of the antenna plane B to a quantity of resource blocks in a plurality of transmission time intervals in the first duration as a data transmission performance value of the antenna plane B in the first duration.

In this embodiment, when one omnidirectional antenna is disposed on each surface in which each antenna plane is located, the CPE may select a part of or all omnidirectional antennas from included omnidirectional antennas as a part of receive antennas, and select a remaining quantity of antennas from included directional antennas as a remaining part of receive antennas. In addition, in a process in which the CPE selects antennas, the omnidirectional antenna is always in an enabled state. In this way, in a process of sequentially obtaining the data transmission performance value of each antenna plane combination or each antenna plane, because the omnidirectional antenna is always in the enabled state, and the omnidirectional antenna can receive signals from all directions, even if data transmission performance of an antenna plane or an antenna plane combination whose data transmission performance value is currently obtained is extremely poor, signal quality can be ensured by using the omnidirectional antenna, so that a scenario in which the signal quality is extremely poor in the obtaining process is avoided.

According to a third aspect, an antenna tuning-free apparatus is provided. The apparatus includes the antenna assembly in the first aspect, and the antenna tuning-free apparatus has a function of implementing behavior in the antenna tuning-free method in the second aspect. The antenna tuning-free apparatus includes at least one module, and the at least one module is configured to implement the antenna tuning-free method provided in the second aspect.

According to a fourth aspect, an antenna tuning-free apparatus is provided. The antenna tuning-free apparatus includes the antenna assembly in the first aspect, and a structure of the antenna tuning-free apparatus further includes a processor and a memory, where the memory is configured to: store a program used to support the antenna tuning-free apparatus in performing the antenna tuning-free method provided in the second aspect, and store related data used to implement the antenna tuning-free method provided in the second aspect. The processor is configured to execute the program stored in the memory. An operation apparatus of the storage device may further include a communications bus, and the communications bus is configured to establish a connection between the processor and the memory.

According to a fifth aspect, a computer-readable storage medium is provided. The computer-readable storage medium stores an instruction, and when the instruction is run on a computer, the computer performs the antenna tuning-free method in the second aspect.

According to a sixth aspect, a computer program product including an instruction is provided. When the computer program product runs on a computer, the computer performs the antenna tuning-free method in the second aspect.

Effects achieved in the third aspect, the fourth aspect, the fifth aspect, and the sixth aspect are similar to effects achieved by using corresponding elements in the first aspect and the second aspect. Details are not described herein again.

The solutions provided in the embodiments bring the following beneficial effects:

The embodiments provide an antenna assembly. The antenna assembly includes a plurality of antenna planes, and each antenna plane is a side surface of a polyhedron. In this way, each antenna plane may be directed to one direction. At least one antenna is disposed on each antenna plane, and a total quantity of antennas included in the plurality of antenna planes is greater than a quantity of receive antennas that are supported by CPE and that are used to simultaneously receive data. A quantity of antennas included in the CPE is greater than the quantity of receive antennas supported by the CPE. Therefore, when a network changes, the CPE may select, from a plurality of antennas included in the CPE, a quantity of antennas as receive antennas, where the quantity is the same as the quantity of receive antennas supported by the CPE. It can be understood that by using the antenna tuning-free apparatus provided in the embodiments, the CPE may not need to adjust directions of antennas, but select, from a redundant quantity of set antennas, antennas with relatively good receiving performance to ensure that the CPE is aligned with a direction with relatively good signal quality. Because the directions of the antennas do not need to be adjusted, inconvenience caused by manual antenna rotation is avoided. In addition, the CPE may not need to provide rotation space for the antenna rotation, thereby reducing a size of the CPE and facilitating installation.

DETAILED DESCRIPTION OF EMBODIMENTS

To make the objectives, solutions, and advantages of the embodiments clearer, the following further describes the implementations in detail with reference to the accompanying drawings.

An application scenario related to embodiments first described before the embodiments are described in detail.

Currently, in some rural or remote areas, a quantity of users is small, so that a distance between base stations deployed by an operator in these areas is usually relatively large. In this case, outdoor customer premises equipment (CPE) may be deployed near an area in which a user works or lives, to ensure network quality in a wide coverage scenario. In addition, in some areas, because cable deployment is inconvenient or deployment costs of cables are relatively high, CPE may also be deployed to resolve a problem of internet access of a user.

Usually, when CPE is deployed, to enable receive antennas of the CPE to be aligned with a direction with relatively good signal quality as much as possible, the CPE may be adjusted, so that the receive antennas of the CPE are aligned with a base station as much as possible. After the CPE is deployed, directions to which the receive antennas of the CPE are directed are fixed. However, in a process of using the CPE, an operator may perform network adjustment, for example, newly add a base station or adjust directions of antennas in the base station, thereby causing a network change. In this case, the directions of the receive antennas of the CPE may no longer be aligned with the direction with relatively good signal quality. Based on this, the embodiments provide an antenna tuning-free apparatus and method. The antenna tuning-free apparatus may be used in CPE. In addition, when a network changes, the antenna tuning-free method provided in the embodiments may be used to ensure that receive antennas of the CPE can always be aligned with a direction with relatively good signal quality.

The following describes an antenna assembly provided in the embodiments.

The antenna assembly 101 provided in the embodiments may be used in CPE. The antenna assembly 101 includes a plurality of antenna planes, each of the plurality of antenna planes is a side surface of a polyhedron, at least one antenna is disposed on each antenna plane, a total quantity of antennas disposed on all antenna planes is greater than a target quantity, and the target quantity is a quantity of receive antennas that are supported by the CPE and that are used to simultaneously receive data.

Figure 1:
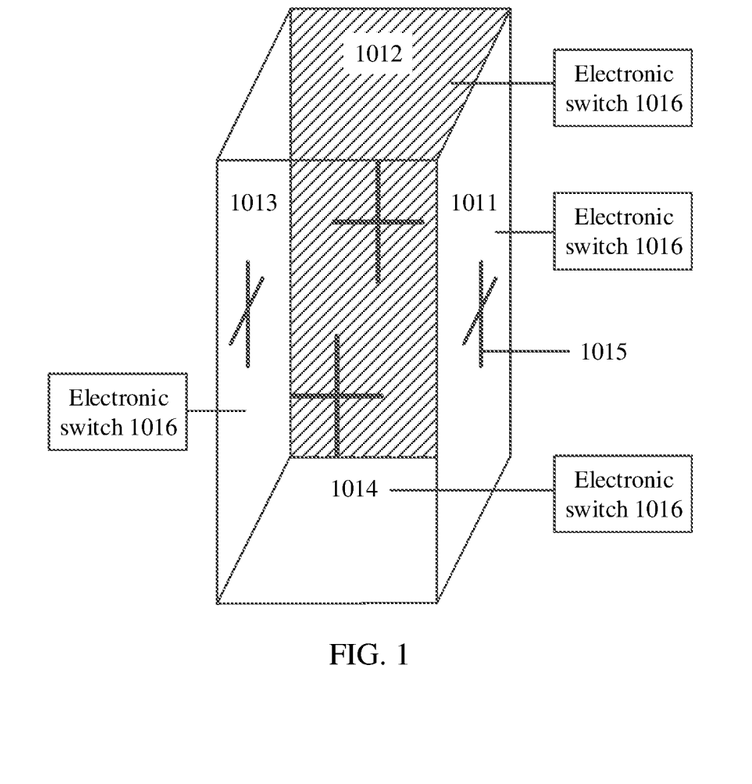
FIG. 1 is a schematic structural diagram of an antenna assembly according to an embodiment.

It should be noted that a quantity of the antenna planes may be 3, 4, 5, or more. FIG. 1 is a schematic diagram of an example of an antenna tuning-free apparatus that has four antenna planes. As shown in FIG. 1, each of the four antenna planes 1011 to 1014 is a side surface of a tetrahedron. At least two antennas 1015 are disposed on each antenna plane.

Optionally, a quantity of antennas disposed on each antenna plane may be the same. For example, as shown in FIG. 1, two antennas may be disposed on each antenna plane. Additionally, in a possible implementation, two antennas may be disposed on each of the antenna plane 1011 and the antenna plane 1013, and another quantity of antennas are disposed on each of the antenna plane 1012 and the antenna plane 1014. For example, three antennas are disposed on each of the antenna plane 1012 and the antenna plane 1014. Alternatively, a quantity of antennas disposed on each of the antenna planes 1011 to 1014 is different. This is not limited in this embodiment.

It should be noted that, the at least two antennas 1015 disposed on each antenna plane may be directional antennas. In addition, for any antenna plane, when two directional antennas are disposed on the antenna plane, the two directional antennas may be vertically disposed.

Optionally, in this embodiment, one omnidirectional antenna may be further disposed on each surface in which each antenna plane is located, where the omnidirectional antenna may be disposed above the directional antenna.

Optionally, as shown in FIG. 1, each of the plurality of antenna planes may be connected to an electronic switch 1016. When the electronic switch 1016 is turned on, an antenna on an antenna plane connected to the electronic switch 1016 is enabled, that is, the antenna on the antenna plane connected to the electronic switch is used as a receive antenna of CPE to receive data.

It should be noted that, in a possible implementation, the electronic switch 1016 connected to each antenna plane may be configured to uniformly control all antennas on a corresponding antenna plane, that is, when the electronic switch 1016 is turned on, all antennas on an antenna plane connected to the electronic switch 1016 that is turned on are enabled. In another possible implementation, the electronic switch 1016 connected to each antenna plane may be configured to independently control an antenna on a corresponding antenna plane, that is, the electronic switch 1016 may select, based on a quantity of required receive antennas, to enable a part of antennas on an antenna plane connected to the electronic switch 1016.

In addition, it should be further noted that, in this embodiment, a total quantity of antennas disposed on all antenna planes of the antenna assembly is greater than a quantity of receive antennas that are supported by the CPE and that are used to simultaneously receive data. In other words, a quantity of antennas included in the antenna assembly is greater than a quantity of antennas required by the CPE. For example, it is assumed that a baseband chip of the CPE supports four receive antennas, for example, each time when the CPE receives data, the CPE supports receiving the data through a maximum of four receive antennas. In this case, the quantity of antennas included in the antenna assembly is greater than 4. If the baseband chip of the CPE supports eight receive antennas, a quantity of antennas that may be disposed in the antenna assembly is greater than 8.

The quantity of antennas included in the antenna assembly is greater than the quantity of receive antennas supported by the CPE. Therefore, when a network changes, the CPE may select, from a plurality of antennas included in the antenna assembly, a quantity of antennas as receive antennas, where the quantity is the same as the quantity of receive antennas supported by the CPE. It can be understood that by using the antenna assembly provided in this embodiment, the CPE may not need to adjust directions of antennas, but select, from a redundant quantity of set antennas, antennas with relatively good receiving performance to ensure that the CPE is aligned with a direction with relatively good signal quality. Because the directions of the antennas do not need to be adjusted, inconvenience caused by manual antenna rotation is avoided. In addition, the CPE may not need to provide rotation space for the antenna rotation, thereby reducing a size of the CPE and facilitating installation.

Figure 2:
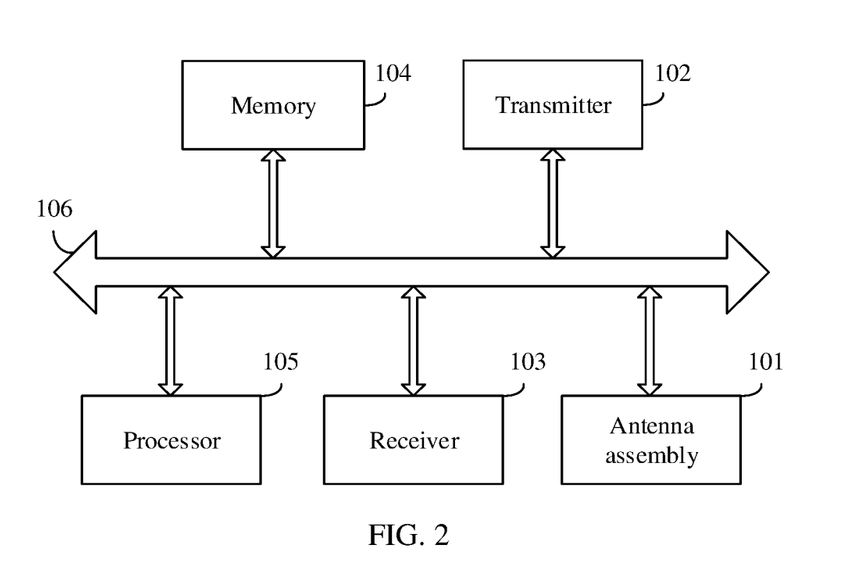
FIG. 2 is a schematic structural diagram of CPE according to an embodiment.

FIG. 2 is a schematic structural diagram of CPE according to an embodiment. As shown in FIG. 2, the CPE may include the antenna assembly 101 shown in FIG. 1, a transmitter 102, a receiver 103, a memory 104, a processor 105, and a communications bus 106. A person of ordinary skill in the art may understand that a structure of the CPE shown in FIG. 2 does not constitute a limitation on the CPE, the CPE may include more or fewer components than those shown in the figure, or combine some components, or have different component arrangements. This is not limited in this embodiment.

The antenna assembly 101 may be an antenna assembly described in the foregoing embodiment and may provide the CPE with antennas whose quantity is greater than a quantity of receive antennas supported by the CPE.

The transmitter 102 may be configured to send data, signaling, and/or the like to a base station. The receiver 103 may be configured to receive data, signaling, and/or the like sent by the base station.

The memory 104 may be configured to store the data sent by the base station, and the memory 104 may be further configured to store one or more running programs and/or modules used to perform the antenna tuning-free method provided in the embodiments. The memory 104 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by an integrated circuit, but is not limited thereto. The memory 104 may exist independently and is connected to the processor 105 through the communications bus 106. The memory 104 may alternatively be integrated with the processor 105.

The processor 105 is a control center of the CPE, and may be a general-purpose central processing unit (CPU), a microprocessor, an application-specific integrated circuit (ASIC), or one or more integrated circuits configured to control program execution of the solutions of the embodiments. The processor 105 may implement the antenna tuning-free method provided in the embodiments by running or executing the software program and/or module stored in the memory 104 and by invoking the data stored in the memory 104.

In addition, the processor 105 and the memory 104 may transfer information through the communications bus 106.

Figure 3:
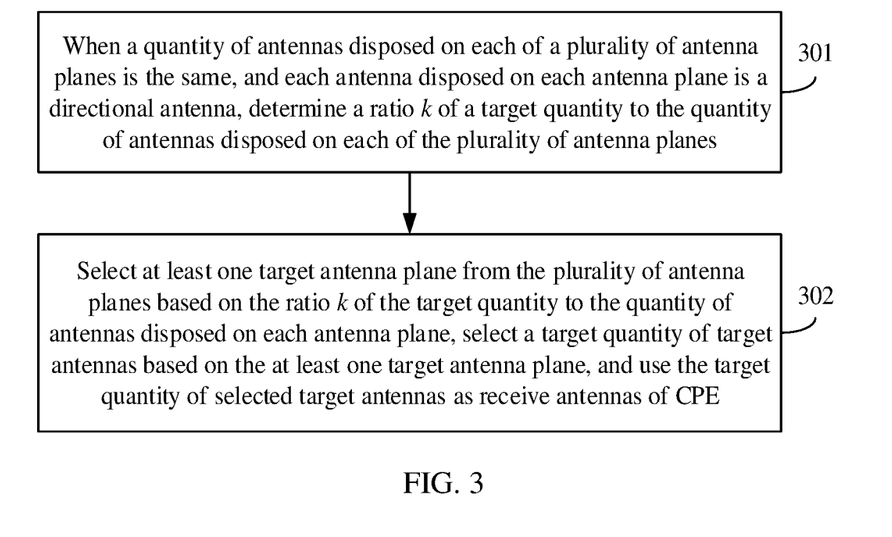
FIG. 3 is a flowchart of an antenna tuning-free method according to an embodiment.

It can be understood from the foregoing descriptions of the antenna assembly that the antenna assembly may include at least two directional antennas disposed on each of the plurality of antenna planes but not include an omnidirectional antenna, or the antenna assembly may include both a plurality of directional antennas and a plurality of omnidirectional antennas. For the two different cases, in the embodiments, at least one target antenna plane may be selected, by using different methods, from the plurality of antenna planes based on the target quantity, then a target quantity of target antennas are determined based on the at least one selected target antenna plane, and the target quantity of determined target antennas are used as receive antennas of the CPE. Next, the embodiments describe, with reference to FIG. 3, an implementation process of an antenna tuning-free method when the antenna assembly includes a plurality of directional antennas but does not include an omnidirectional antenna. Referring to FIG. 3, the method may include the following steps.

Step 301: When a quantity of antennas disposed on each of a plurality of antenna planes is the same, and each antenna disposed on each antenna plane is a directional antenna, determine a ratio k of a target quantity to the quantity of antennas disposed on each of the plurality of antenna planes.

In this embodiment, the quantity of antennas disposed on each antenna plane of the antenna assembly may be the same or may be different. For CPE, a memory of the CPE may store a correspondence among an identifier of each antenna plane of the antenna assembly included in the CPE, an antenna type of an antenna disposed on each antenna plane, and the quantity of antennas disposed on each antenna plane. Based on this, the CPE may determine, based on the stored correspondence, whether the quantity of antennas disposed on each antenna plane is the same. If the quantity of antennas disposed on each antenna plane is the same, the CPE may determine the ratio k of the target quantity to the quantity of antennas disposed on each of the plurality of antenna planes.

The target quantity is a quantity of receive antennas supported by the CPE. It should be noted that the quantity of receive antennas supported by the CPE is determined by a baseband chip of the CPE. Currently, a common quantity of receive antennas supported by the CPE may be 2, 4, 8, 16, or the like. For example, when the quantity of receive antennas supported by the CPE is 2, the target quantity is 2; when the quantity of receive antennas supported by the CPE is 4, the target quantity is 4. Details are not described again in this embodiment.

Step 302: Select at least one target antenna plane from the plurality of antenna planes based on the ratio k of the target quantity to the quantity of antennas disposed on each antenna plane, determine a target quantity of target antennas based on the at least one target antenna plane, and use the target quantity of determined target antennas as receive antennas of the CPE.

A data transmission performance value of the at least one target antenna plane is greater than a first threshold.

In this embodiment, the ratio k of the target quantity to the quantity of antennas disposed on each antenna plane may be greater than 1, or may not be greater than 1. Based on different values of k, the CPE may select, in the following several different manners, the at least one target antenna plane from the plurality of antenna planes, determine the target quantity of target antennas based on the at least one antenna plane, and use the target quantity of target antennas as the receive antennas of the CPE.

(1) If k is an integer greater than 1, every k continuous antenna planes in the plurality of antenna planes are classified into one antenna plane combination, to obtain a plurality of antenna plane combinations; a data transmission performance value of each of the plurality of antenna plane combinations in first duration is sequentially obtained; an antenna plane combination whose data transmission performance value in the first duration is greater than the first threshold is selected from the plurality of antenna plane combinations, and at least one antenna plane included in an antenna plane combination with the largest data transmission performance value in the first duration in the selected antenna plane combination is determined as the at least one target antenna plane; and all antennas included in the at least one target antenna plane are determined as the target quantity of target antennas.

When k is an integer greater than 1, it indicates that a total quantity of antennas on k antenna planes is equal to the target quantity. That is, the CPE may use the antennas included in the k antenna planes as receive antennas. In addition, when an antenna plane is aligned with a base station, quality of a signal received through an antenna on another antenna plane adjacent to the antenna plane is better than quality of a signal received through an antenna on an antenna plane opposite to the antenna plane. Therefore, the CPE may select k continuous antenna planes with relatively good receiving performance from the plurality of antenna planes and use the k selected continuous antenna planes as the at least one target antenna plane.

For example, when selecting the k continuous antenna planes, the CPE may classify every k continuous antenna planes in the plurality of antenna planes into one antenna plane combination, to obtain the plurality of antenna plane combinations. For example, it is assumed that the target quantity is 8, the antenna assembly includes five antenna planes, and four antennas are disposed on each antenna plane. In this case, k is 2, that is, the CPE only needs to select two continuous antenna planes from the five antenna planes. For ease of description, the five antenna planes are numbered 1 to 5 in sequence. The antenna planes 1 and 2 are classified into one antenna plane combination, the antenna planes 2 and 3 are classified into one antenna plane combination, the antenna planes 3 and 4 are classified into one antenna plane combination, the antenna planes 4 and 5 are classified into one antenna plane combination, and the antenna planes 5 and 1 are classified into one antenna plane combination. In this way, five antenna plane combinations are obtained. In this way, each antenna plane combination actually includes the target quantity of antennas.

After obtaining the plurality of antenna plane combinations, the CPE may sequentially obtain the data transmission performance value of each of the plurality of antenna plane combinations in the first duration. For example, for any antenna plane combination A in the plurality of antenna plane combinations, the CPE may enable an antenna on each of a plurality of antenna planes included in the antenna plane combination A, and disable an antenna on another antenna plane other than the plurality of antenna planes included in the antenna plane combination A; receive, in the first duration, data through antennas on the plurality of antenna planes included in the antenna plane combination A, and determine a ratio of a throughput of the antenna plane combination A to a quantity of resource blocks of the antenna plane combination A in each transmission time interval in the first duration; and determine a sum of ratios of a throughput to a quantity of resource blocks in a plurality of transmission time intervals in the first duration as a data transmission performance value of the antenna plane combination A in the first duration.

It should be noted that the CPE may enable the antenna on each antenna plane by turning on an electronic switch connected to each of the plurality of antenna planes included in the antenna plane combination A; and for the another antenna plane other than the plurality of antenna planes included in the antenna plane combination A, the CPE may disable the antenna on the another antenna plane by turning off an electronic switch connected to the another antenna plane. In this way, all antennas included in the antenna plane combination A are used as current receive antennas. In this case, the CPE may receive data signals through all the antennas included in the antenna plane combination A. Then, the CPE may start a timer, where running duration of the timer is the first duration. Starting from a moment at which the timer starts, the CPE may record a throughput and a quantity of resource blocks in each transmission time interval and calculate a ratio of the throughput to the quantity of resource blocks in the corresponding transmission time interval. Until the timer stops, the CPE may calculate a sum of ratios of a throughput to a quantity of resource blocks in a plurality of transmission time intervals during running of the timer, and determine the calculated sum as the data transmission performance value of the antenna plane combination A in the first duration.

The data transmission performance value of the antenna plane combination A in the first duration may be used to represent receiving performance of the CPE when the antennas included in the antenna plane combination A are used as receive antennas. That the data transmission performance value is larger means that a direction to which an antenna included in the antenna plane combination A is directed is closer to a target direction, and the receiving performance is better. The target direction is a direction to which the antenna is directed when the antenna is aligned with the base station.

For each of the plurality of antenna plane combinations, the CPE may determine the data transmission performance value of each antenna plane combination in the first duration with reference to the described manner of determining the data transmission performance value of the antenna plane combination A in the first duration. After determining the data transmission performance value of each antenna plane combination in the first duration, the CPE may select, from the plurality of antenna plane combinations, the antenna plane combination whose data transmission performance value is greater than the first threshold. The first threshold may be a smallest value of a plurality of data transmission performance values of the plurality of antenna plane combinations, or may be an average value of a plurality of data transmission performance values of the plurality of antenna plane combinations.

After selecting, from the plurality of antenna plane combinations, the antenna plane combination whose data transmission performance value is greater than the first threshold, the CPE may select, from the selected antenna plane combination, an antenna plane combination with the largest data transmission performance value in the first duration. That a data transmission performance value is larger means that a direction to which an antenna included in an antenna plane combination is directed is closer to a direction to which the antenna is directed when the antenna is aligned with the base station, and receiving performance is better. Therefore, the antenna plane combination with the largest data transmission performance value is actually an antenna plane combination that can ensure best received signal quality of the CPE. In this case, the CPE may use antennas included in the selected antenna plane combination with the largest data transmission performance value as the target quantity of antennas, namely, the receive antennas of the CPE.

Optionally, in a possible implementation, after selecting, from the plurality of antenna plane combinations, the antenna plane combination whose data transmission performance value is greater than the first threshold, the CPE may randomly select one antenna plane combination from the selected antenna plane combination, and determine at least one antenna plane included in the randomly selected antenna plane combination as the at least one target antenna plane.

(2) If k is greater than 1 and k is not an integer, k is rounded, to obtain r; every r continuous antenna planes in the plurality of antenna planes are classified into one antenna plane combination, to obtain a plurality of antenna plane combinations; a data transmission performance value of each of the plurality of antenna plane combinations in first duration is sequentially obtained; an antenna plane combination whose data transmission performance value in the first duration is greater than the first threshold is selected from the plurality of antenna plane combinations, and an antenna plane combination with the largest data transmission performance value in the first duration is determined in the selected antenna plane combination; at least one antenna plane included in the determined antenna plane combination and an antenna plane adjacent to the at least one antenna plane are determined as the at least one target antenna plane; a difference T between the target quantity and a quantity of antennas included in the at least one antenna plane is determined; T antennas are selected from the antenna plane adjacent to the at least one antenna plane; and an antenna disposed on each of the at least one antenna plane and the T selected antennas are determined as the target quantity of target antennas, namely, the receive antennas of the CPE.

When k is greater than 1 and k is not an integer, it indicates that the target quantity is not an integer multiple of the quantity of antennas on each antenna plane. In this case, the CPE cannot directly select all antennas on several antenna planes as the target quantity of target antennas, and the CPE may round k, to obtain r. For example, when k is 2.6, 2 is obtained after the CPE rounds k, that is, r is 2.

After determining r, the CPE may classify every r continuous antenna planes in the plurality of antenna planes into one antenna plane combination, to obtain the plurality of antenna plane combinations. For an implementation process in which the CPE classifies every r continuous antenna planes in the plurality of antenna planes into one antenna plane combination, refer to the foregoing implementation process in which every k continuous antenna planes in the plurality of antenna planes are classified into one antenna plane combination. Details are not described herein again in this embodiment.

After obtaining the plurality of antenna plane combinations, with reference to the method described above, the CPE may obtain the data transmission performance value of each of the plurality of antenna plane combinations in the first duration, select, from the plurality of antenna plane combinations, the antenna plane combination whose data transmission performance value in the first duration is greater than the first threshold, and determine, in the selected antenna plane combination, an antenna plane combination with the largest data transmission performance value in the first duration.

The determined antenna plane combination with the largest data transmission performance value is an antenna plane combination that is in the plurality of antenna plane combinations and whose antenna direction is currently closest to a target direction. However, a total quantity of antennas included in one antenna plane combination is less than the target quantity, that is, the quantity of antennas included in one antenna plane combination is less than the quantity of receive antennas supported by the CPE. Therefore, the CPE may further select the T antennas from another antenna plane based on the difference T between the target quantity and a total quantity of antennas included in the antenna plane combination. In this way, the antennas included in the selected antenna plane combination with the largest data transmission performance value and other T selected antennas may be used as the target quantity of target antennas.

For example, because a direction of an antenna on an antenna plane included in the selected antenna plane combination is closest to the target direction, compared with an antenna plane that is not adjacent to the antenna plane included in the antenna plane combination, a difference between the target direction and a direction of an antenna on an antenna plane that is adjacent to the antenna plane included in the antenna plane combination is smaller. Based on this, the CPE may select the remaining T antennas from the antenna plane adjacent to the antenna plane included in the antenna plane combination.

For example, it is assumed that there are five antenna planes, three antennas are disposed on each antenna plane, and the target quantity is 8. In this case, r is 2. It is assumed that the antenna plane combination with the largest data transmission performance value is an antenna plane combination including antenna planes 2 and 3. Because the antenna planes 2 and 3 include a total of six antennas, the CPE further needs to select two antennas. In this case, the CPE may select two antennas from an antenna plane 1 adjacent to the antenna plane 2, or may select two antennas from an antenna plane 4 adjacent to the antenna plane 3. In this way, six antennas included in the antenna plane 2 and the antenna plane 3 and two antennas selected from another antenna plane are used as eight receive antennas of the CPE.

Optionally, in a possible implementation, after selecting, from the plurality of antenna plane combinations, the antenna plane combination whose data transmission performance value is greater than the first threshold, the CPE may randomly select one antenna plane combination from the selected antenna plane combination, and determine at least one antenna plane included in the randomly selected antenna plane combination as the at least one target antenna plane.

(3) If k is not greater than 1, a data transmission performance value of each of the plurality of antenna planes in first duration is obtained; an antenna plane whose data transmission performance value in the first duration is greater than the first threshold is selected from the plurality of antenna planes, and an antenna plane with the largest data transmission performance value in the first duration in the selected antenna plane is determined as the at least one target antenna plane; and the target quantity of target antennas are selected on the at least one target antenna plane, and the selected antennas are used as receive antennas of the CPE.

When k is not greater than 1, it indicates that the target quantity is less than or equal to the quantity of antennas on each antenna plane, that is, the CPE only needs to select one antenna plane from the plurality of antenna planes. In this case, the CPE may obtain the data transmission performance value of each of the plurality of antenna planes in the first duration; select, from the plurality of antenna planes, the antenna plane whose data transmission performance value is greater than the first threshold; determine the antenna plane with the largest data transmission performance value in the selected antenna plane as the target antenna plane; and select the target quantity of antennas from antennas included in the target antenna plane as receive antennas of the CPE. The first threshold may be an average value of a plurality of data transmission performance values corresponding to the plurality of antenna planes, or may be a smallest value of a plurality of data transmission performance values corresponding to the plurality of antenna planes.

For example, for any antenna plane B in the plurality of antenna planes, the CPE may enable at least two antennas on the antenna plane B, and disable an antenna on another antenna plane other than the antenna plane B; receive, in the first duration, data through the at least two antennas on the antenna plane B, and determine a ratio of a throughput of the antenna plane B to a quantity of resource blocks of the antenna plane B in each transmission time interval in the first duration; and determine a sum of ratios of a throughput of the antenna plane B to a quantity of resource blocks in a plurality of transmission time intervals in the first duration as a data transmission performance value of the antenna plane B in the first duration.

The CPE may enable all antennas on the antenna plane B by turning on an electronic switch connected to the antenna plane B, and disable all antennas on the another antenna plane by turning off an electronic switch connected to the another antenna plane. In this way, the antenna on the antenna plane B is used as a current receive antenna. In this case, the CPE may receive a data signal through the antenna disposed on the antenna plane B. Then, the CPE may start a timer, where running duration of the timer is the first duration. Starting from a moment at which the timer starts, the CPE may record a throughput and a quantity of resource blocks in each transmission time interval and calculate a ratio of the throughput to the quantity of resource blocks in the corresponding transmission time interval. Until the timer stops, the CPE may calculate a sum of ratios of a throughput to a quantity of resource blocks in a plurality of transmission time intervals during running of the timer, and determine the calculated sum as the data transmission performance value of the antenna plane B in the first duration.

After it is determined that the data transmission performance value of each antenna plane in the first duration is obtained, if k is equal to 1, it indicates that the target quantity is equal to a quantity of antennas on an antenna plane. In this case, the CPE may use all antennas on the antenna plane with the largest data transmission performance value in the plurality of antenna planes as receive antennas of the CPE. If k is less than 1, it indicates that the target quantity is less than a quantity of antennas on an antenna plane. In this case, the CPE may determine the target quantity of antennas in a plurality of antennas disposed on the antenna plane with the largest data transmission performance value as receive antennas of the CPE. A direction to which an antenna on the selected antenna plane with the largest data transmission performance value is directed is closest to a target direction. Therefore, selecting all or a part of antennas on the selected antenna plane as receive antennas of the CPE can ensure better receiving performance of the CPE.

Optionally, in a possible implementation, after selecting, from the plurality of antenna planes, the antenna plane whose data transmission performance value is greater than the first threshold, the CPE may randomly select one antenna plane from the selected antenna plane, and use the randomly selected antenna plane as the target antenna plane.

In this embodiment, a quantity of antennas included in the CPE is greater than the quantity of receive antennas supported by the CPE. Therefore, when a network changes, the CPE may select, from a plurality of included antennas, a quantity of antennas with relatively good data transmission performance as receive antennas, where the quantity is the same as the quantity of receive antennas supported by the CPE. That is, the CPE may not need to adjust directions of antennas, but select, from a redundant quantity of set antennas, antennas with relatively good receiving performance to ensure that the CPE is aligned with a direction with relatively good signal quality. Because the CPE does not need to be aligned with the direction with the relatively good signal quality by rotating the directions of the antennas, when a high gain of the receive antennas of the CPE is ensured, no motor needs to be set in the CPE, and no rotation space needs to be provided for antenna rotation, thereby reducing a size of the CPE, facilitating installation, and reducing manufacturing costs.

The foregoing embodiment mainly describes an implementation process in which when the antenna assembly includes a plurality of directional antennas but does not include an omnidirectional antenna, the CPE selects at least one target antenna plane from the plurality of antenna planes based on the target quantity, and determines the target quantity of target antennas based on the at least one target antenna plane. The following describes, with reference to FIG. 4, an implementation process in which when the antenna assembly includes a plurality of directional antennas and a plurality of omnidirectional antennas, the CPE selects at least one target antenna plane from the plurality of antenna planes based on the target quantity, and determines the target quantity of target antennas based on the at least one target antenna plane.

Figure 4:
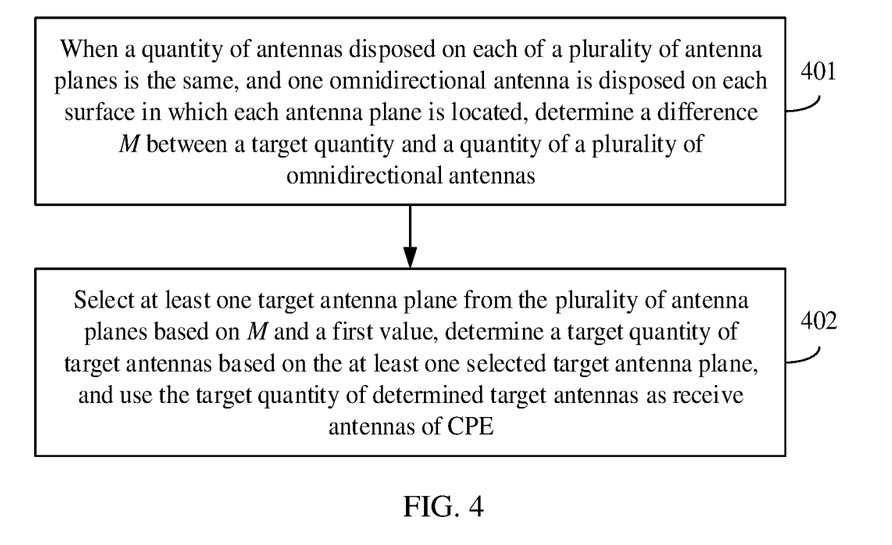
FIG. 4 is a flowchart of an antenna tuning-free method according to an embodiment.

FIG. 4 is a flowchart of an antenna tuning-free method according to an embodiment. As shown in FIG. 4, the method includes the following steps.

Step 401: When a quantity of antennas disposed on each of a plurality of antenna planes is the same, and one omnidirectional antenna is disposed on each surface in which each antenna plane is located, determine a difference M between a target quantity and a quantity N of a plurality of omnidirectional antennas.

In this embodiment, when one omnidirectional antenna is disposed on each surface in which each antenna plane is located, the CPE may select a part of or all omnidirectional antennas from the plurality of omnidirectional antennas and select a part of directional antennas from a plurality of antennas included in the plurality of antenna planes, to obtain a target quantity of target antennas.

The CPE may first calculate a difference M between the target quantity and the quantity of the plurality of omnidirectional antennas, and the CPE may select the omnidirectional antenna and a target antenna plane in different manners based on different values of M.

Step 402: Select at least one target antenna plane from the plurality of antenna planes based on M and a first value, determine the target quantity of target antennas based on the at least one selected target antenna plane, and use the target quantity of determined target antennas as receive antennas of CPE.

The first value is a quantity of antennas disposed on each of the plurality of antenna planes. Because at least one antenna is disposed on each antenna plane, the first value is a positive integer greater than or equal to 1.

In this embodiment, the CPE may select the omnidirectional antenna and the target antenna plane in different manners based on a value of M. For example, the CPE may first compare M with the first value and select the at least one target antenna plane based on a comparison result.

If M is greater than the first value, the CPE may round a ratio of M to the first value, to obtain w; classify every w+1 continuous antenna planes in the plurality of antenna planes into one antenna plane combination, to obtain a plurality of antenna plane combinations; sequentially obtain a data transmission performance value of each of the plurality of antenna plane combinations in first duration; select, from the plurality of antenna plane combinations, an antenna plane combination whose data transmission performance value in the first duration is greater than a first threshold, and determine at least one antenna plane included in an antenna plane combination with the largest data transmission performance value in the first duration in the selected antenna plane combination as the at least one target antenna plane; select M antennas from an antenna included in the at least one target antenna plane; and determine the M selected antennas and the plurality of omnidirectional antennas as receive antennas of the CPE. The first threshold may be an average value of a plurality of data transmission performance values corresponding to the plurality of antenna plane combinations, or may be a smallest value of a plurality of data transmission performance values.

It should be noted that, if the difference M between the target quantity and N is greater than the first value, it indicates that the target quantity is greater than a quantity of omnidirectional antennas included in the CPE. In this case, the CPE may use all included omnidirectional antennas as receive antennas. In addition, because the quantity of omnidirectional antennas does not reach the target quantity, the CPE may select a remaining quantity of antennas, that is, M directional antennas, from the plurality of included directional antennas, and use the M selected antennas and all the omnidirectional antennas as receive antennas of the CPE.

For example, when the CPE selects the M remaining antennas from the plurality of included directional antennas, the CPE may calculate a ratio of M to the first value. Because M is greater than the first value, the ratio is greater than 1. The first value is a quantity of remaining directional antennas other than the omnidirectional antenna on each antenna plane. Therefore, when the ratio is greater than 1, it indicates that a quantity of directional antennas on one antenna plane plus the quantity of all the omnidirectional antennas still cannot reach the target quantity. That is, the CPE needs to select at least two antenna planes from the plurality of antenna planes. In this way, a quantity of directional antennas on the at least two antenna planes plus the quantity of all the omnidirectional antennas can reach the target quantity.

Based on this, the CPE may round the ratio of M to the first value, to obtain w, and classify every w+1 continuous antenna planes in the plurality of antenna planes into one antenna plane combination, to obtain the plurality of antenna plane combinations. Then the CPE may enable all the omnidirectional antennas, and with reference to the related method described in the foregoing embodiment, the CPE may sequentially obtain the data transmission performance value of each of the plurality of antenna plane combinations in the first duration and select, from the plurality of antenna plane combinations, the antenna plane combination with the largest data transmission performance value in the first duration. That a data transmission performance value is larger means that a direction to which an antenna on an antenna plane in a corresponding antenna plane combination is directed is closer to the target direction, and performance of receiving a data signal is better. Therefore, the antenna plane combination with the largest data transmission performance value is actually an antenna plane combination that can ensure best received signal quality of the CPE. In this case, the CPE may select the M directional antennas from directional antennas included in the antenna plane combination as remaining receive antennas.

It should be noted that, in this embodiment, in a process in which the CPE performs the antenna tuning-free method provided in the embodiments, the plurality of omnidirectional antennas included in the CPE are always in an enabled state. In this way, in a process of sequentially obtaining the data transmission performance value of each antenna plane combination or each antenna plane, because the omnidirectional antenna is always in the enabled state, and the omnidirectional antenna can receive signals from all directions, even if data transmission performance of an antenna plane or an antenna plane combination whose data transmission performance value is currently obtained is extremely poor, signal quality can be ensured by using the omnidirectional antenna, so that a scenario in which the signal quality is extremely poor in the obtaining process is avoided.

Optionally, in a possible implementation, after selecting, from the plurality of antenna plane combinations, the antenna plane combination whose data transmission performance value is greater than the first threshold, the CPE may randomly select one antenna plane combination from the selected antenna plane combination, and determine at least one antenna plane included in the randomly selected antenna plane combination as the at least one target antenna plane.

Optionally, if M is not greater than the first value, the CPE may further determine whether M is greater than 0, and if M is greater than 0, the CPE may obtain a data transmission performance value of each of the plurality of antenna planes in first duration; select, from the plurality of antenna planes, an antenna plane whose data transmission performance value in the first duration is greater than the first threshold, and determine an antenna plane with the largest data transmission performance value in the first duration in the selected antenna plane as the at least one target antenna plane; select M antennas from an antenna included in the at least one determined target antenna plane; and determine the M selected antennas and the plurality of omnidirectional antennas as the target quantity of target antennas. The first threshold may be an average value of a plurality of data transmission performance values corresponding to the plurality of antenna planes, or may be a smallest value of a plurality of data transmission performance values corresponding to the plurality of antenna planes.

If M is greater than 0 but not greater than the first value, it indicates that after all the omnidirectional antennas are used as receive antennas, a quantity of remaining receive antennas is less than a quantity of directional antennas on each antenna plane. That is, the CPE may select a remaining quantity of receive antennas from a plurality of antennas included in one antenna plane. Based on this, with reference to the related method described in the foregoing embodiment, the CPE may obtain the data transmission performance value of each of the plurality of antenna planes, and select, from the plurality of antenna planes, the antenna plane with the largest data transmission performance value. That a data transmission performance value is larger means that a direction of an antenna on an antenna plane is closer to a target direction. Therefore, the CPE may select M directional antennas from a directional antenna included in the antenna plane with the largest data transmission performance value as a remaining receive antenna, to ensure that the selected directional antenna is aligned with a base station as much as possible, thereby ensuring relatively good receiving performance of the CPE.

Optionally, in a possible implementation, after selecting, from the plurality of antenna planes, the antenna plane whose data transmission performance value is greater than the first threshold, the CPE may alternatively randomly select one antenna plane from the selected antenna plane, and use the randomly selected antenna plane as the target antenna plane.

Optionally, if M is not greater than 0, it indicates that the quantity of omnidirectional antennas included in the CPE is greater than or equal to the target quantity. In this case, the CPE may select a first quantity of omnidirectional antennas from the plurality of included omnidirectional antennas, where the first quantity is less than the target quantity, and antenna planes corresponding to every two antennas in the first quantity of selected omnidirectional antennas are not adjacent. After selecting the first quantity of omnidirectional antennas, the CPE may select a second quantity of directional antennas from the included directional antennas. The second quantity is a difference between the target quantity and the first quantity.

For example, it is assumed that the target quantity is 4, and the quantity of omnidirectional antennas included in the CPE is 4. In this case, the CPE may select two opposite antenna planes from the four antenna planes and use two omnidirectional antennas on surfaces in which the two selected antenna planes are located as two of four receive antennas of the CPE. Then, the CPE may select two directional antennas from a plurality of included directional antennas and use the two selected omnidirectional antennas and the two selected directional antennas as receive antennas of the CPE.

It should be noted that, for an implementation process in which the CPE selects the second quantity of directional antennas from the included directional antennas, refer to the implementation process, described in the foregoing embodiment, in which the CPE selects M directional antennas from the included directional antennas. Details are not described herein again in this embodiment.

In this embodiment, a quantity of antennas included in the CPE is greater than a quantity of receive antennas supported by the CPE. Therefore, when a network changes, the CPE may select, from the plurality of included antennas, a quantity of antennas with relatively good data transmission performance as receive antennas, where the quantity is the same as the quantity of receive antennas supported by the CPE. That is, the CPE may not need to adjust directions of antennas, but select, from a redundant quantity of set antennas, antennas with relatively good receiving performance to ensure that the CPE is aligned with a direction with relatively good signal quality. Because the CPE does not need to be aligned with the direction with the relatively good signal quality by rotating the directions of the antennas, when a high gain of the antennas of the CPE is ensured, no motor may need to be set in the CPE, and no rotation space needs to be provided for antenna rotation, thereby reducing a size of the CPE, facilitating installation, and reducing manufacturing costs.

In addition, in this embodiment, when one omnidirectional antenna is disposed on each antenna plane, the CPE may select a part of or all omnidirectional antennas from the included omnidirectional antennas as a part of receive antennas, and select a remaining quantity of antennas from the included directional antennas as a remaining part of receive antennas. In addition, after determining the selected omnidirectional antenna, the CPE may enable the selected omnidirectional antenna, and then select the remaining quantity of directional antennas by determining a data transmission performance value of each antenna plane combination or each antenna plane. In this way, in a process of sequentially obtaining the data transmission performance value of each antenna plane combination or each antenna plane, because the omnidirectional antenna is always in the enabled state, and the omnidirectional antenna can receive signals from all directions, even if data transmission performance of an antenna plane or an antenna plane combination whose data transmission performance value is currently obtained is extremely poor, signal quality can be ensured by using the omnidirectional antenna, so that a scenario in which the signal quality is extremely poor in the obtaining process is avoided.

The foregoing embodiment mainly describes an implementation process in which the CPE selects the target quantity of antennas from the plurality of antennas included in the plurality of antenna planes when the quantity of antennas disposed on each antenna plane of the antenna tuning-free apparatus is the same. Optionally, in the embodiments, the quantity of antennas disposed on each antenna plane may alternatively be different. In this case, the CPE may sequentially number each antenna plane, and then sequentially select, starting from an antenna on the first antenna plane based on the target quantity, a target quantity of antennas as one antenna group, to obtain a plurality of antenna groups; obtain a data transmission performance value of each of the plurality of antenna groups in the first duration, and determine at least one antenna group whose data transmission performance value in the first duration is greater than the first threshold as at least one target antenna group; and use a target quantity of antennas included in an antenna group with the largest data transmission performance value in the at least one target antenna group as receive antennas of the CPE, or use a target quantity of antennas in any one of the at least one target antenna group as receive antennas of the CPE. For an implementation in which the CPE obtains the data transmission performance value of each of the plurality of antenna groups in the first duration, refer to the related method described in the foregoing embodiment. Details are not described herein again in this embodiment.

The following describes an antenna tuning-free apparatus provided in the embodiments.

Figure 5:
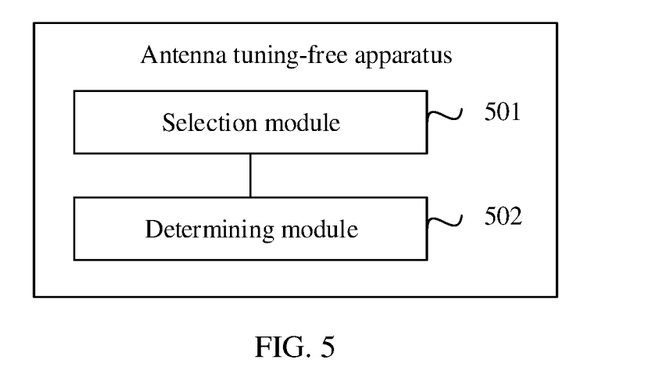
FIG. 5 is a schematic structural diagram of an antenna tuning-free apparatus according to an embodiment.

FIG. 5 is a block diagram of an antenna tuning-free apparatus according to an embodiment. The apparatus may be used in the foregoing CPE, and the CPE includes the antenna assembly described in the foregoing embodiment. As shown in FIG. 5, the apparatus includes a selection module 501 and a determining module 502.

The selection module 501 is configured to perform an operation of selecting at least one target antenna plane based on k in step 301 and step 302 or configured to perform an operation of selecting at least one target antenna plane based on a target quantity in step 401 and step 402.

The determining module 502 is configured to perform an operation of determining a target quantity of target antennas based on the at least one target antenna plane and using the target quantity of determined target antennas as receive antennas of the CPE in step 302, or configured to perform an operation of determining a target quantity of target antennas based on the at least one selected target antenna plane and using the target quantity of determined target antennas as receive antennas of the CPE in step 402.

Figure 6:
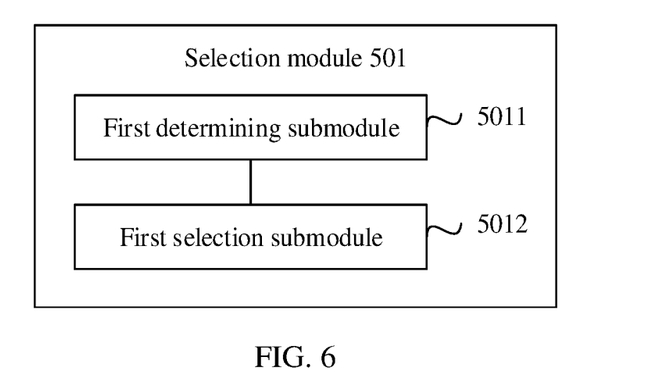
FIG. 6 is a block diagram of a selection module according to an embodiment.

Optionally, referring to FIG. 6, the selection module 501 includes:

a first determining submodule 5011, configured to: when a quantity of antennas disposed on each of a plurality of antenna planes is the same, and each antenna disposed on each antenna plane is a directional antenna, determine a ratio k of a target quantity to a quantity of antennas disposed on each of the plurality of antenna planes; and a first selection submodule 5012, configured to select at least one target antenna plane from the plurality of antenna planes based on k.

Optionally, the first selection submodule 5012 is configured to:

if k is an integer greater than 1, classify every k continuous antenna planes in the plurality of antenna planes into one antenna plane combination, to obtain a plurality of antenna plane combinations;

sequentially obtain a data transmission performance value of each of the plurality of antenna plane combinations in first duration;

select, from the plurality of antenna plane combinations, an antenna plane combination whose data transmission performance value in the first duration is greater than a first threshold, and determine, in the selected antenna plane combination, an antenna plane combination with the largest data transmission performance value in the first duration; and determine at least one antenna plane included in the determined antenna plane combination as the at least one target antenna plane.

Optionally, the first selection submodule 5012 is configured to:

if k is greater than 1 and k is not an integer, round k, to obtain r;

classify every r continuous antenna planes in the plurality of antenna planes into one antenna plane combination, to obtain a plurality of antenna plane combinations;

sequentially obtain a data transmission performance value of each of the plurality of antenna plane combinations in first duration;

select, from the plurality of antenna plane combinations, an antenna plane combination whose data transmission performance value in the first duration is greater than a first threshold, and determine, in the selected antenna plane combination, an antenna plane combination with the largest data transmission performance value in the first duration; and determine at least one antenna plane included in the determined antenna plane combination and an antenna plane adjacent to the at least one antenna plane as the at least one target antenna plane.

Optionally, the determining module 502 is configured to:

determine a difference T between the target quantity and a quantity of antennas included in the at least one antenna plane;

select T antennas from the antenna plane adjacent to the at least one antenna plane; and use an antenna disposed on each of the at least one antenna plane and the T selected antennas as a target quantity of target antennas.

Optionally, the first selection submodule 5012 is configured to:

if k is not greater than 1, obtain a data transmission performance value of each of the plurality of antenna planes in first duration;

select, from the plurality of antenna planes, an antenna plane whose data transmission performance value in the first duration is greater than a first threshold, and determine, in the selected antenna plane, an antenna plane with the largest data transmission performance value in the first duration; and determine the determined antenna plane as the at least one target antenna plane.

Figure 7:
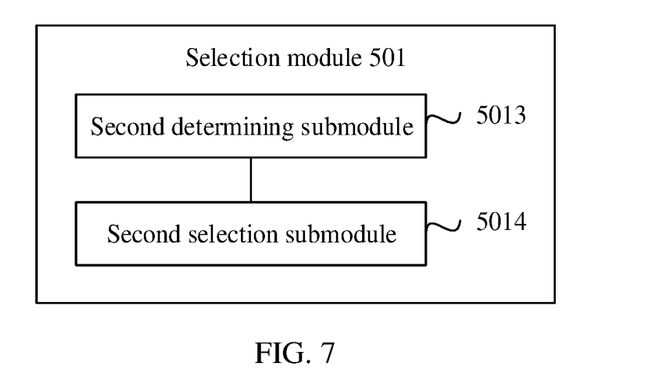
FIG. 7 is a block diagram of another selection module according to an embodiment.

Optionally, referring to FIG. 7, the selection module 501 includes:

a second determining submodule 5013, configured to: when a quantity of antennas disposed on each of a plurality of antenna planes is the same, and one omnidirectional antenna is disposed on each surface in which each antenna plane is located, determine a difference M between a target quantity and a quantity N of a plurality of omnidirectional antennas; and a second selection submodule 5014, configured to select at least one target antenna plane from the plurality of antenna planes based on M and a first value, where the first value is the quantity of antennas disposed on each of the plurality of antenna planes.

Optionally, the second selection submodule 5014 is configured to:

if M is greater than the first value, round a ratio of M to the first value, to obtain w;

classify every w+1 continuous antenna planes in the plurality of antenna planes into one antenna plane combination, to obtain a plurality of antenna plane combinations;

sequentially obtain a data transmission performance value of each of the plurality of antenna plane combinations in first duration;

select, from the plurality of antenna plane combinations, an antenna plane combination whose data transmission performance value in the first duration is greater than a first threshold, and determine, in the selected antenna plane combination, an antenna plane combination with the largest data transmission performance value in the first duration; and determine at least one antenna plane included in the determined antenna plane combination as the at least one target antenna plane; and correspondingly, the determining module 502 is configured to:

select M antennas from an antenna included in the at least one target antenna plane; and determine the M selected antennas and the plurality of omnidirectional antennas as a target quantity of target antennas.

Optionally, the second selection submodule is configured to:

if M is not greater than the first value and M is greater than 0, obtain a data transmission performance value of each of the plurality of antenna planes in first duration;

select, from the plurality of antenna planes, an antenna plane whose data transmission performance value in the first duration is greater than a first threshold, and determine, in the selected antenna plane, an antenna plane with the largest data transmission performance value in the first duration; and determine the determined antenna plane as the at least one target antenna plane; and correspondingly, the determining module 502 is configured to:
  select M antennas from an antenna included in the at least one target antenna plane; and
  determine the M selected antennas and the plurality of omnidirectional antennas as a target quantity of target antennas.
Optionally, the selection module 501 is configured to:
  for any antenna plane combination A in the plurality of antenna plane combinations, enable an antenna on each of a plurality of antenna planes included in the antenna plane combination A, and disable an antenna on another antenna plane other than the plurality of antenna planes included in the antenna plane combination A;
  receive, in the first duration, data through antennas on the plurality of antenna planes included in the antenna plane combination A, and determine a ratio of a throughput of the antenna plane combination A to a quantity of resource blocks of the antenna plane combination A in each transmission time interval in the first duration; and
  determine a sum of ratios of a throughput to a quantity of resource blocks in a plurality of transmission time intervals in the first duration as a data transmission performance value of the antenna plane combination A in the first duration.
Optionally, the selection module 501 is configured to:
  for any antenna plane B in the plurality of antenna planes, enable at least one antenna on the antenna plane B, and disable an antenna on another antenna plane other than the antenna plane B;
  receive, in the first duration, data through the at least one antenna on the antenna plane B, and determine a ratio of a throughput of the antenna plane B to a quantity of resource blocks of the antenna plane B in each transmission time interval in the first duration; and
  determine a sum of ratios of a throughput of the antenna plane B to a quantity of resource blocks in a plurality of transmission time intervals in the first duration as a data transmission performance value of the antenna plane B in the first duration.
In this embodiment, a quantity of antennas included in the CPE is greater than a quantity of receive antennas supported by the CPE. Therefore, when a network changes, the CPE may select, from a plurality of included antennas, a quantity of antennas with relatively good data transmission performance as receive antennas, where the quantity is the same as the quantity of receive antennas supported by the CPE. That is, the CPE may not need to adjust directions of antennas, but select, from a redundant quantity of set antennas, antennas with relatively good receiving performance to ensure that the CPE is aligned with a direction with relatively good signal quality. Because the CPE does not need to be aligned with the direction with the relatively good signal quality by rotating the directions of the antennas, not only a high gain of the antennas of the CPE is ensured, but also inconvenience caused by manual rotation can be avoided. In addition, the CPE may not need to provide rotation space for antenna rotation, thereby reducing a size of the CPE and facilitating installation.
When the antenna tuning-free apparatus provided in the foregoing embodiment performs the antenna tuning-free method, division of the foregoing function modules is only used as an example for description. During actual application, the foregoing functions may be allocated to different function modules for implementation based on a requirement. That is, an internal structure of the device is divided into different function modules to implement all or some of the functions described above. In addition, the antenna tuning-free apparatus provided in the foregoing embodiment and the method embodiments shown in FIG. 1 to FIG. 4 belong to a same concept. For a specific implementation process of the antenna tuning-free apparatus, refer to the method embodiments. Details are not described herein again.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

That is, an embodiment provides a computer-readable storage medium. When the computer-readable storage medium is run on a computer, the computer performs the steps of the antenna tuning-free methods shown in FIG. 3 to FIG. 4.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are embodiments provided, but are not intended as limiting. Any modification, equivalent replacement, or improvement made without departing from the spirit and principle of the embodiments should fall within the scope of the embodiments.

What is claimed is:
1. A method, used by customer premises equipment (CPE), wherein the CPE comprises an antenna assembly including a plurality of antenna planes, each of the plurality of antenna planes is a side surface of a polyhedron, at least one antenna is disposed on each antenna plane, and the method comprises:
  selecting at least one target antenna plane from the plurality of antenna planes based on a target quantity, wherein a data transmission performance value of the at least one target antenna plane is greater than a first threshold, and the data transmission performance value is used to represent receiving performance of receiving data by the CPE through an antenna on the at least one target antenna plane; and determining a target quantity of target antennas based on the antenna comprised in the at least one target antenna plane and using the target quantity of determined target antennas as receive antennas of the CPE, wherein the selecting of the at least one target antenna plane from a plurality of antenna planes based on a target quantity comprises:

when a quantity of antennas disposed on each of the plurality of antenna planes is the same, and each antenna disposed on each antenna plane is a directional antenna, determining a ratio k of the target quantity to the quantity of antennas disposed on each of the plurality of antenna planes; and selecting the at least one target antenna plane from the plurality of antenna planes based on k.

2. The method according to claim 1, wherein the selecting of the at least one target antenna plane from the plurality of antenna planes based on k comprises:

if k is an integer greater than 1, classifying every k continuous antenna planes in the plurality of antenna planes into one antenna plane combination, to obtain a plurality of antenna plane combinations;

sequentially obtaining a data transmission performance value of each of the plurality of antenna plane combinations in first duration;

selecting, from the plurality of antenna plane combinations, an antenna plane combination whose data transmission performance value in the first duration is greater than the first threshold, and determining, in the selected antenna plane combination, an antenna plane combination with the largest data transmission performance value in the first duration; and determining at least one antenna plane comprised in the determined antenna plane combination as the at least one target antenna plane.

3. The method according to claim 1, wherein the selecting of the at least one target antenna plane from the plurality of antenna planes based on k comprises:

if k is greater than 1 and k is not an integer, rounding k, to obtain r;

classifying every r continuous antenna planes in the plurality of antenna planes into one antenna plane combination, to obtain a plurality of antenna plane combinations;

sequentially obtaining a data transmission performance value of each of the plurality of antenna plane combinations in first duration;

selecting, from the plurality of antenna plane combinations, an antenna plane combination whose data transmission performance value in the first duration is greater than the first threshold, and determining, in the selected antenna plane combination, an antenna plane combination with the largest data transmission performance value in the first duration; and determining at least one antenna plane comprised in the determined antenna plane combination and an antenna plane adjacent to the at least one antenna plane as the at least one target antenna plane.

4. An apparatus, used in CPE, wherein the CPE comprises an antenna assembly including a plurality of antenna planes, each of the plurality of antenna planes is a side surface of a polyhedron, at least one antenna is disposed on each antenna plane, and the apparatus comprises:

a selection module, configured to select at least one target antenna plane from a plurality of antenna planes based on a target quantity, wherein a data transmission performance value of the at least one target antenna plane is greater than a first threshold, and the data transmission performance value is used to represent receiving performance of receiving data by the CPE through an antenna on the at least one target antenna plane; and a determining module, configured to: determine a target quantity of target antennas based on the antenna comprised in the at least one target antenna plane, and use the target quantity of determined target antennas as receive antennas of the CPE, a first determining submodule, configured to, when a quantity of antennas disposed on each of the plurality of antenna planes is the same, and each antenna disposed on each antenna plane is a directional antenna, determine a ratio k of the target quantity to the quantity of antennas disposed on each of the plurality of antenna planes; and a first selection submodule configured to select the at least one target antenna plane from the plurality of antenna planes based on k.

5. The apparatus according to claim 4, wherein the first selection submodule is configured to:

if k is an integer greater than 1, classify every k continuous antenna planes in the plurality of antenna planes into one antenna plane combination, to obtain a plurality of antenna plane combinations;

sequentially obtain a data transmission performance value of each of the plurality of antenna plane combinations in first duration;

select, from the plurality of antenna plane combinations, an antenna plane combination whose data transmission performance value in the first duration is greater than the first threshold, and determine, in the selected antenna plane combination, an antenna plane combination with the largest data transmission performance value in the first duration; and determine at least one antenna plane comprised in the determined antenna plane combination as the at least one target antenna plane.

6. The apparatus according to claim 5, wherein the selection module is configured to:

for any antenna plane combination A in the plurality of antenna plane combinations, enable an antenna on each of a plurality of antenna planes comprised in the antenna plane combination A, and disable an antenna on another antenna plane other than the plurality of antenna planes comprised in the antenna plane combination A;

receive, in the first duration, data through antennas on the plurality of antenna planes comprised in the antenna plane combination A, and determine a ratio of a throughput of the antenna plane combination A to a quantity of resource blocks of the antenna plane combination A in each transmission time interval in the first duration; and determine a sum of ratios of a throughput to a quantity of resource blocks in a plurality of transmission time intervals in the first duration as a data transmission performance value of the antenna plane combination A in the first duration.

7. The apparatus according to claim 4, wherein the first selection submodule is configured to:

if k is greater than 1 and k is not an integer, round k, to obtain r;

classify every r continuous antenna planes in the plurality of antenna planes into one antenna plane combination, to obtain a plurality of antenna plane combinations;

sequentially obtain a data transmission performance value of each of the plurality of antenna plane combinations in first duration;

select, from the plurality of antenna plane combinations, an antenna plane combination whose data transmission performance value in the first duration is greater than the first threshold, and determine, in the selected antenna plane combination, an antenna plane combination with the largest data transmission performance value in the first duration; and determine at least one antenna plane comprised in the determined antenna plane combination and an antenna plane adjacent to the at least one antenna plane as the at least one target antenna plane.

8. The apparatus according to claim 7, wherein the determining module is configured to:

determine a difference T between the target quantity and a quantity of antennas comprised in the at least one antenna plane;

select T antennas from the antenna plane adjacent to the at least one antenna plane; and use an antenna disposed on each of the at least one antenna plane and the T selected antennas as the target quantity of target antennas.

9. The apparatus according to claim 4, wherein the first selection submodule is configured to:

if k is not greater than 1, obtain a data transmission performance value of each of the plurality of antenna planes in first duration;

select, from the plurality of antenna planes, an antenna plane whose data transmission performance value in the first duration is greater than the first threshold, and determine, in the selected antenna plane, an antenna plane with the largest data transmission performance value in the first duration; and determine the determined antenna plane as the at least one target antenna plane.

10. The apparatus according to claim 9, wherein the selection module is configured to:

for any antenna plane B in the plurality of antenna planes, enable at least one antenna on the antenna plane B, and disable an antenna on another antenna plane other than the antenna plane B;

receive, in the first duration, data through the at least one antenna on the antenna plane B, and determine a ratio of a throughput of the antenna plane B to a quantity of resource blocks of the antenna plane B in each transmission time interval in the first duration; and determine a sum of ratios of a throughput of the antenna plane B to a quantity of resource blocks in a plurality of transmission time intervals in the first duration as a data transmission performance value of the antenna plane B in the first duration.

11. The apparatus according to claim 4, wherein the selection module comprises:

a second determining submodule, configured to: when a quantity of antennas disposed on each of the plurality of antenna planes is the same, and one omnidirectional antenna is disposed on each surface in which each antenna plane is located, determine a difference M between the target quantity and a quantity N of the plurality of antenna planes; and a second selection submodule, configured to select the at least one target antenna plane from the plurality of antenna planes based on M and a first value, wherein the first value is the quantity of antennas disposed on each of the plurality of antenna planes.

12. The apparatus according to claim 11, wherein the second selection submodule is configured to:

if M is greater than the first value, round a ratio of M to the first value, to obtain W;

classify every W+1 continuous antenna planes in the plurality of antenna planes into one antenna plane combination, to obtain a plurality of antenna plane combinations;

sequentially obtain a data transmission performance value of each of the plurality of antenna plane combinations in first duration;

select, from the plurality of antenna plane combinations, an antenna plane combination whose data transmission performance value in the first duration is greater than the first threshold, and determine, in the selected antenna plane combination, an antenna plane combination with the largest data transmission performance value in the first duration; and determine at least one antenna plane comprised in the determined antenna plane combination as the at least one target antenna plane; and correspondingly, the determining module is configured to:

select M antennas from the antenna comprised in the at least one target antenna plane; and determine the M selected antennas and a plurality of omnidirectional antennas as the target quantity of target antennas.

13. The apparatus according to claim 11, wherein the second selection submodule is configured to:

if M is not greater than the first value and M is greater than 0, obtain a data transmission performance value of each of the plurality of antenna planes in first duration;

select, from the plurality of antenna planes, an antenna plane whose data transmission performance value in the first duration is greater than the first threshold, and determine, in the selected antenna plane, an antenna plane with the largest data transmission performance value in the first duration; and determine the determined antenna plane as the at least one target antenna plane; and correspondingly, the determining module is configured to:

select M antennas from the antenna comprised in the at least one target antenna plane; and determine the M selected antennas and a plurality of omnidirectional antennas as the target quantity of target antennas.

* * * * *